(12) United States Patent
Lush

(10) Patent No.: US 8,662,016 B2
(45) Date of Patent: Mar. 4, 2014

(54) NYJER OR THISTLE SEED BIRD FEEDER

(76) Inventor: Raymon W. Lush, Bloomfield, NE (US)

( * ) Notice: Subject to any disclaimer, the term of this patent is extended or adjusted under 35 U.S.C. 154(b) by 243 days.

(21) Appl. No.: 12/924,590

(22) Filed: Sep. 30, 2010

(65) Prior Publication Data

US 2012/0079987 A1    Apr. 5, 2012

(51) Int. Cl.
*A01K 5/00*    (2006.01)

(52) U.S. Cl.
USPC ........................................ 119/52.2; 119/57.8

(58) Field of Classification Search
USPC ............ 119/51.01, 52.2, 52.3, 57.8, 57.9, 64, 119/65, 68, 69
See application file for complete search history.

(56) References Cited

U.S. PATENT DOCUMENTS

| | | | |
|---|---|---|---|
| 4,201,155 A * | 5/1980 | Hyde, Jr. ....................... | 119/57.8 |
| 5,855,943 A | 1/1999 | Lush et al. | |
| 5,876,740 A | 3/1999 | Schwalenberg et al. | |
| 6,047,661 A | 4/2000 | Lush | |
| 6,073,582 A | 6/2000 | Lush | |
| 6,390,021 B1 * | 5/2002 | Krenzel ....................... | 119/52.2 |
| 6,427,629 B1 | 8/2002 | Lush | |
| 6,805,225 B2 * | 10/2004 | Freedman ..................... | 190/112 |
| 6,866,004 B1 | 3/2005 | Lush | |
| 7,032,538 B1 | 4/2006 | Lush | |
| 7,131,395 B1 * | 11/2006 | Lush ........................... | 119/57.8 |
| 7,185,605 B1 | 3/2007 | Lush | |
| 7,198,004 B1 | 4/2007 | Lush | |
| 7,237,508 B1 | 7/2007 | Lush | |
| 7,302,911 B1 | 12/2007 | Lush | |
| 7,503,282 B1 | 3/2009 | Lush | |
| 7,506,611 B1 | 3/2009 | Lush | |

* cited by examiner

*Primary Examiner* — David Parsley
*Assistant Examiner* — Thien Thanh Pham
(74) *Attorney, Agent, or Firm* — Dennis L. Thomte; Thomte Patent Law Office

(57) ABSTRACT

A sock-like bird feeder comprising a tubular feeder body constructed of flexible cloth, fabric or lightweight plastic which may be folded, flattened or collapsed for storage and/or shipment. One or more feed baffles are positioned in the interior of the feeder body and are constructed of a cloth or fabric material. The flexible nature of the feed baffles permits the feed baffles to also be flattened, folded or collapsed along with the feeder body for storage and/or shipment.

5 Claims, 3 Drawing Sheets

NYJER OR THISTLE SEED BIRD FEEDER

BACKGROUND OF THE INVENTION

1. Field of the Invention

This invention relates to a Nyjer or thistle seed bird feeder and more particularly to a bird feeder of the "sock" type. Even more particularly, this invention relates to a sock-type bird feeder for feeding Nyjer or thistle seeds wherein the feeder body thereof includes one or more feed baffles or even feed devices which are positioned in the feeder body in a vertically spaced-apart relationship which maintain a certain amount of feed at that level, even though the main feed supply has dropped below that funnel member.

2. Description of the Related Art

Many types of bird feeders of the sock-type have been previously provided wherein the feeder body is comprised of a flexible fabric or cloth material of the mesh-type with the feeder body having openings formed therein which are small enough to prevent bird feed in the feeder body from freely passing therethrough but which are large enough so that birds may feed therethrough. The mesh material also enables birds to cling thereto. As the feed level in the feeder body drops, that portion of the feeder body above the level of the feed is not usable by the birds.

Applicant has previously received patents including baffle members or even feed devices to overcome the problems set forth above. In U.S. Pat. No. 7,185,605, Applicant disclosed feed baffle plates. In U.S. Pat. No. 7,198,004, Applicant disclosed inverted, truncated conical-shaped members or baffles. In U.S. Pat. No. 7,237,508, Applicant disclosed level feed discs or baffles. However, the level feed devices or baffle members disclosed in Applicant's previous patents were all utilized with metallic bird feeders. In each of Applicant's previous patents, the even-feed devices or baffle members were constructed of either a rigid plastic material or metal material. Because the even-feed devices or baffle members of Applicant's previous patents were constructed of a rigid plastic or metal material, the same limited the collapsibility of the feeders for storage or shipment.

To best of Applicant's knowledge, no one has previously provided even-feed devices or feed baffles in bird feeders of the sock type. If Applicant's prior art even-feed devices and baffle members were utilized in a feeder of the sock type, those even-feed devices would prevent the feeder from being truly collapsible for storage and/or shipment.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A thistle or Nyjer seed bird feeder is disclosed which includes an elongated, sock-like tubular feeder body which has a selectively closable upper end, a lower end, and a non-metallic, flexible mesh wall extending therebetween. The mesh wall defines feed openings therein which are small enough to prevent bird feed in the feeder body from freely passing therethrough but which are large enough so the birds may feed therethrough. At least one flexible feed baffle member is positioned in the feeder body and is secured thereto above the lower end thereof which maintains a certain amount of bird feed at that level in the feeder body while permitting bird feed to pass downwardly therethrough. The feeder body and baffle member or members are comprised of a flexible material which permits the feeder body and the baffle member or members to be folded, flattened or collapsed for shipment or storage when the feeder body is empty of bird feed.

Means is also provided for maintaining the flexible baffle member or members in a functional position when the feeder is being used to feed birds.

It is therefore a principal object of the invention to provide an improved thistle or Nyjer seed bird feeder.

A further object of the invention is to provide a bird feeder of the type described which includes an elongated, sock-like tubular feeder body with one or more flexible baffle members being positioned in the feeder body in a vertically spaced-apart manner.

A further object of the invention is to provide a feeder of the type described which is collapsible or foldable for storage and/or shipment.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
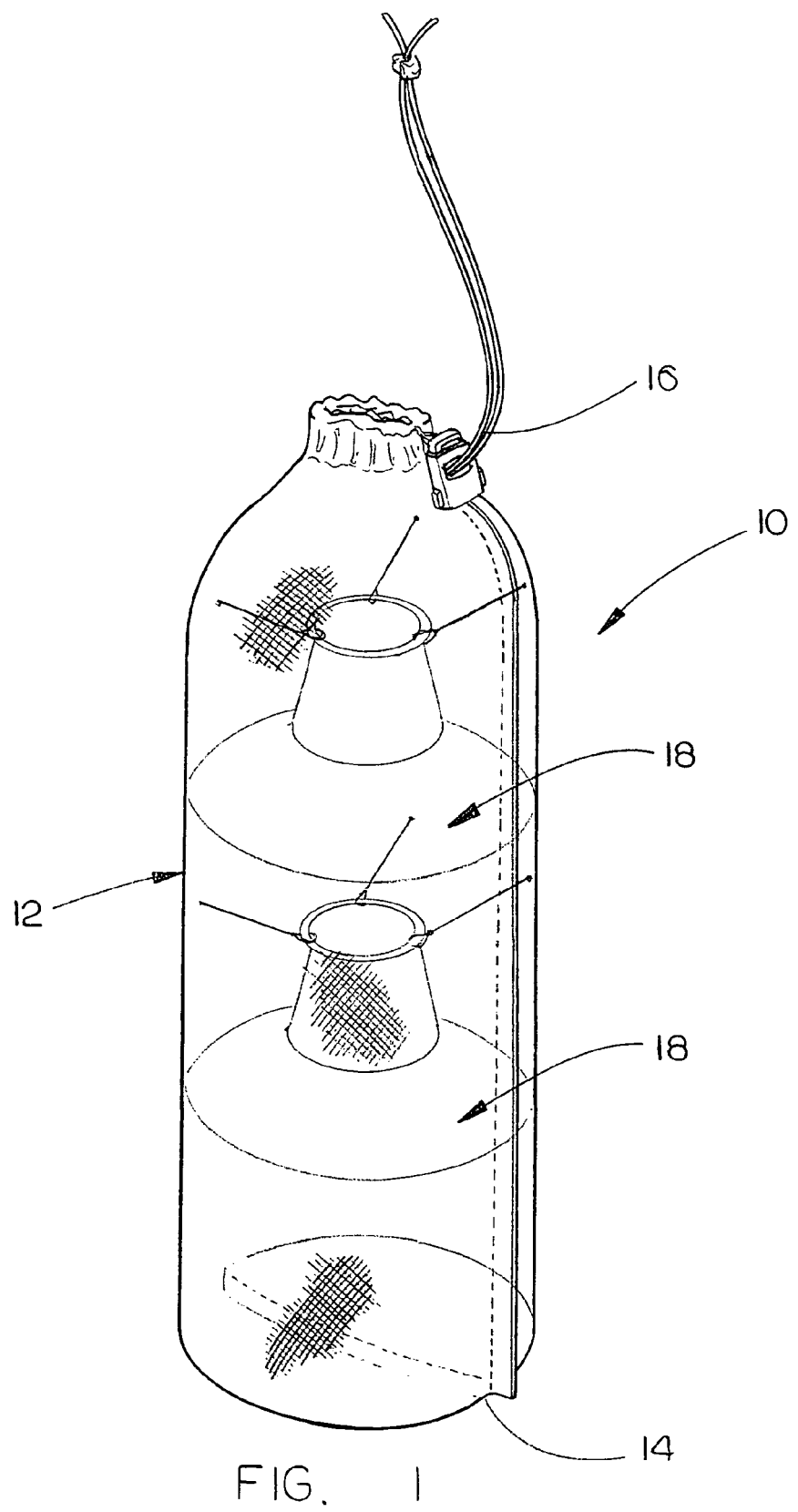
FIG. 1 is a perspective view of the bird feeder of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The sock-like bird feeder of this invention is referred to generally by the reference numeral 10 which includes a mesh feeder body 12. Although the bird feeder is ideally suited for feeding Nyjer or thistle seeds, it may also be used to feed sunflower seeds. Feeder body 12 is constructed of a flexible cloth or fabric mesh material which is sown together at one side thereof and which has a closed bottom 14. The upper end of feeder body 12 is provided with a drawstring 16 for selectively closing the upper end of the feeder body 12. Feeder body 12 may also be constructed of a very lightweight polyester or plastic material if so desired.

Figure 2:
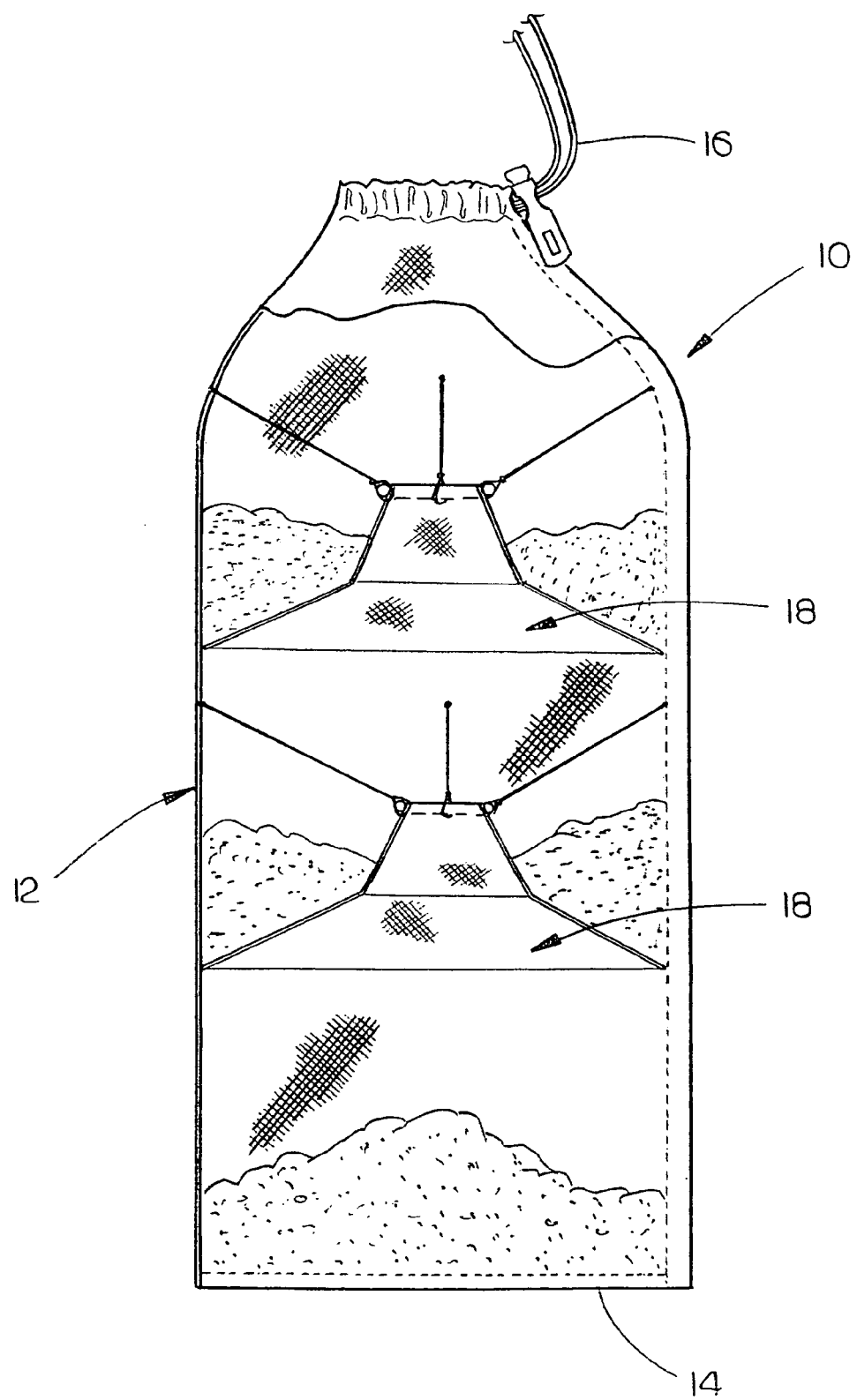
FIG. 2 is a sectional view of the bird feeder of this invention.
Figure 3:
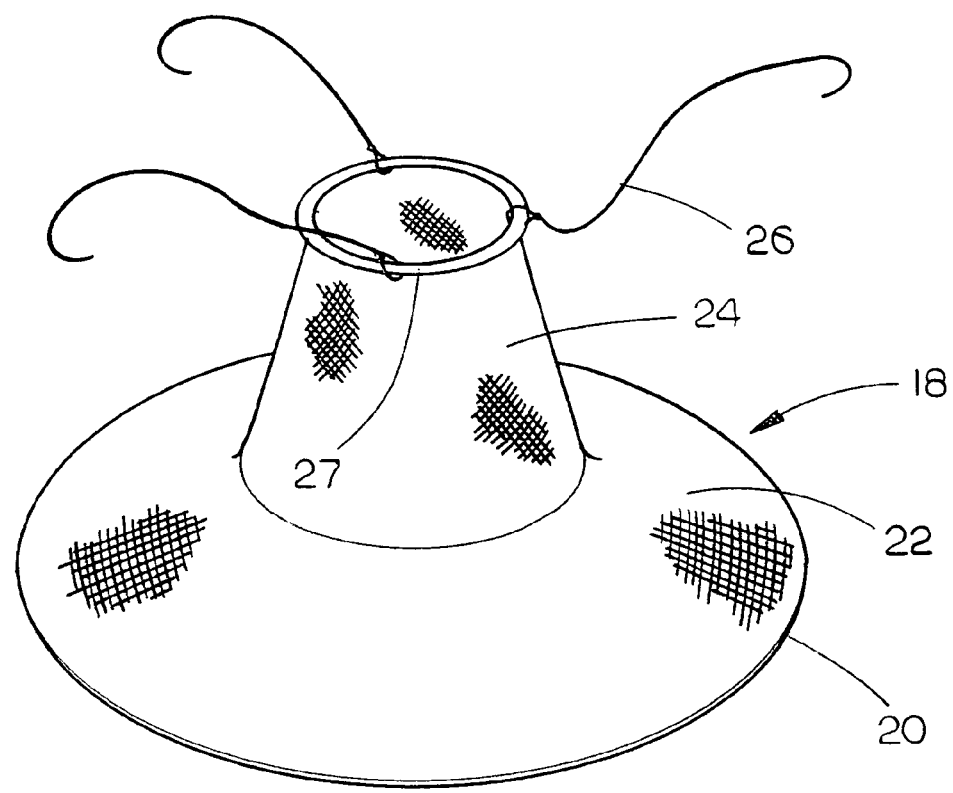
FIG. 3 is a perspective view of one form of the feed baffles of this invention.

At least one and preferably a plurality of even-feed devices or feed baffles 18 are positioned within the feeder body 12 in a vertically spaced-apart relationship as illustrated in FIGS. 1 and 2. The feed baffles 18 are also constructed of a flexible cloth or fabric material so that they may be folded, flattened or collapsed with the feeder body 12 when the feeder 10 is flattened, folded or collapsed for storage and/or shipment. The feed baffles 18 may also be of a lightweight polyester or plastic material.

Feed baffle 18 has a disc-shaped peripheral portion 20, an inverted truncated conical portion 22 and a generally cylindrical portion 24 which extends upwardly from the upper end of the inverted, truncated conical portion 22. The upper end of the generally cylindrical portion 24 is open so that feed may pass downwardly through the generally cylindrical portion 24, the inverted truncated, conical-shaped portion 22 and downwardly from the feed baffle. The peripheral edge of peripheral portion 20 is secured to the interior wall surface of the feeder body 12 by stitching or the like. Since the feed baffle 18 is constructed of a fabric material, cloth material, lightweight polyester or plastic material, the feed baffle 18 would tend to collapse downwardly when bird seed 26 is placed thereonto. A plurality of elongated flexible supports 26, in the form of threads or the like, are secured to the upper end of the cylindrical portion 24 of the feed baffle 18 and extend upwardly therefrom and which are secured to the feeder body 12 above the feed baffle 18 so that the feed baffle 18 will maintain its functional shape when subjected to the weight of bird seeds thereon. Preferably, the upper end of the cylindrical portion 24 has a ring 27 secured thereto to which the supports 26 are attached. Each of the feed baffles 18 maintain a certain amount of bird feed thereon while permitting bird feed to pass downwardly therefrom into the feeder. The openings in the mesh feeder body 12 are small enough to resist the free flow of bird seeds outwardly therethrough but which are large enough to permit a bird to feed therethrough.

The fact that the feeder body 12 and the feed baffles 18 and supports 26 are flexible permits the bird feeder 10, when bird feed is not contained therein, to be folded flat or collapsed for storage or shipment. If the feed baffles 18 were constructed of a hard plastic or metal material, they would not be able to be folded or collapsed with the feeder body 12 for storage or shipment.

Figure 4:
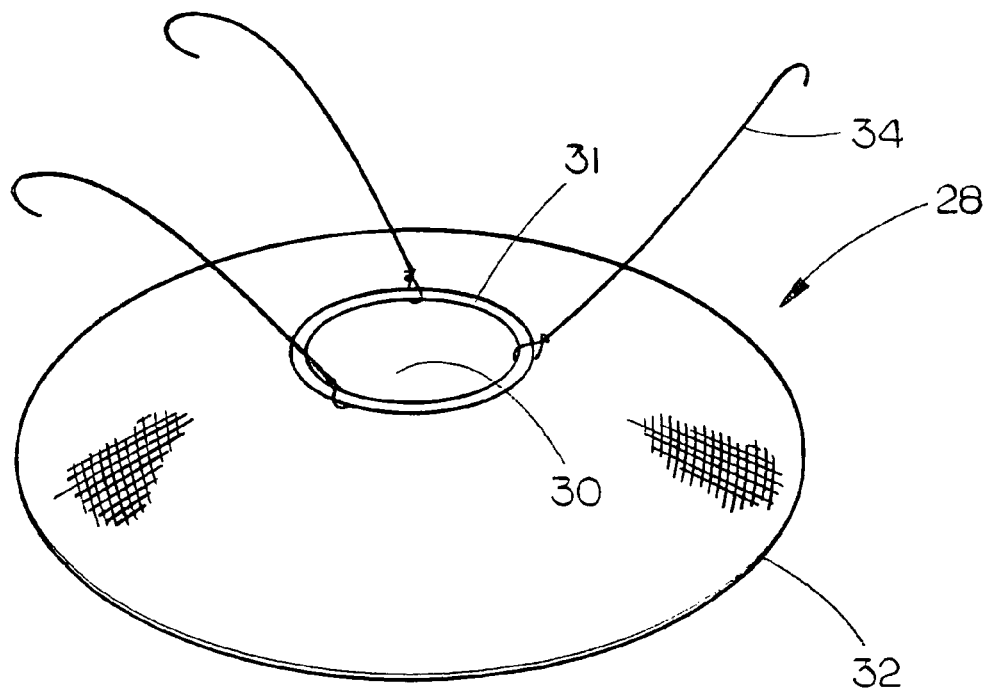
FIG. 4 is a perspective view of a second form of the feed baffles of this invention.

A modified form of the feed baffle is illustrated in FIG. 4 and is referred to generally by the reference numeral 28. Feed baffle 28 is disc-shaped and has a central opening 30 formed therein to permit feed to pass downwardly therethrough. Preferably, a ring 31 is secured to the feed baffle 28 around the central opening 30. The periphery 32 of the feed baffle 28 is attached to the inside surface of the feeder body 12 by stitching or the like. The feed baffle 28 is also comprised of a flexible cloth material, fabric material, a lightweight polyester or plastic material, it will also have supporting members or threads 34 extending upwardly from ring 31 adjacent the opening 30 to the inner wall surface of the feeder body 12 for attachment thereto so that the feed baffle 28 will be maintained in its functional position or configuration when subjected to the weight of bird seed thereon. The feed baffle 28 maintains a certain amount of bird feed thereon while permitting bird feed to flow downwardly through the central opening 30.

The feed baffles 18 and 28 ensure that there will be bird feed positioned thereon even though the level of the primary feed would be positioned therebelow thereby permitting birds to feed at different levels from the bird feeder 10 even though there may only be a small amount of feed remaining in the bottom of the bird feeder.

Although the preferred embodiment of the invention is to utilize flexible feed baffles to permit the entire feeder to be folded, flattened or collapsed, there may be a situation wherein the feed baffles could be constructed of a rigid plastic or metal material. For example, in some instances the sock-like feeder is shipped and then sold with the feeder being filled with bird seed prior to shipment and sale. In that case, the feed baffles do not have to be flexible.

Thus it can be seen that a novel sock-like bird feeder has been provided which includes feed baffles therein and which may be folded flat or collapsed for storage or shipment. It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A thistle seed or Nyjer seed bird feeder, comprising:
   an elongated, sock-like tubular feeder body having a selectively closable upper end, a lower end, and a non-metallic mesh wall extending therebetween;
   said mesh wall defining feed openings which are small enough to prevent bird feed in said feeder body from freely passing therethrough but which are large enough so that birds may feed therethrough;
   a plurality of vertically spaced-apart flexible feed baffle members positioned in said feeder body and secured thereto above said lower end thereof;
   each of said flexible feed baffle members maintaining a certain amount of bird feed at that level in said feeder body while permitting bird feed to pass downwardly therethrough;
   each of said feed baffle members comprising an inverted, truncated funnel member;
   each of said funnel members of said feed baffle members including a lower peripheral portion which is positioned closely to the inside surface of said feeder body, a truncated, inverted conical portion, having upper and lower ends, which extends upwardly from said lower peripheral portion, and a generally cylindrical portion, having upper and lower ends, which extends upwardly from said upper end of said truncated, inverted conical portion;
   and a plurality of flexible support members secured to and extending between said upper end of said cylindrical portion of each of said feed baffle members and said feeder body which maintain said generally cylindrical portion and said conical portion thereof in a functional position;
   said feeder body and each of said feed baffle members being comprised of a flexible material which permits said feeder body and said feed baffle members to be folded or collapsed for shipment or storage when said feeder body is empty of bird feed.

2. The bird feeder of claim 1 wherein said feeder body and said feed baffle members are comprised of a fabric material.

3. The bird feeder of claim 1 wherein said feeder body and said feed baffle members are comprised of a cloth material.

4. The bird feeder of claim 1 wherein said feeder body and said feed baffle members are comprised of a lightweight polyester or plastic material.

5. A thistle seed or Nyjer seed collapsible bird feeder, comprising:
   an elongated, sock-like tubular feeder body having a selectively closable upper end, a lower end, and a non-metallic mesh wall extending therebetween;

said mesh wall defining feed openings which are small enough to prevent bird feed in said feeder body from freely passing therethrough but which are large enough so that birds may feed therethrough;

a plurality of vertically spaced-apart flexible feed baffle members positioned in said feeder body and secured thereto above said lower end thereof;

each of said flexible feed baffle members maintaining a certain amount of bird feed at that level in said feeder body while permitting bird feed to pass downwardly therethrough;

each of said feed baffle members comprising a disc-shaped member having a central opening;

each of said disc-shaped members including a lower peripheral portion which is positioned closely to the inside surface of said feeder body;

and a plurality of elongated flexible support members having upper and lower ends;

said lower ends of flexible support members being secured to said disc-shaped members adjacent said central openings thereof;

said upper ends of said flexible support members being secured to said feeder body above said feed baffle members;

said flexible support members maintaining said feed baffle members in a functional position;

said feeder body and each of said feed baffle members being comprised of a flexible material which permits said feeder body and said feed baffle members to be folded or collapsed for shipment or storage when said feeder body is empty of bird feed.

* * * * *